(12) United States Patent
Togino

(10) Patent No.: US 6,757,107 B2
(45) Date of Patent: Jun. 29, 2004

(54) OPTICAL PATH SPLITTING ELEMENT AND IMAGE DISPLAY APPARATUS USING THE SAME

(75) Inventor: Takayoshi Togino, Koganei (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/131,031

(22) Filed: Apr. 25, 2002

(65) Prior Publication Data

US 2003/0072092 A1 Apr. 17, 2003

(30) Foreign Application Priority Data

Apr. 25, 2001 (JP) ........................................ 2001-127806

(51) Int. Cl.$^7$ ................................................ G02B 5/04
(52) U.S. Cl. ...................................... 359/631; 359/632
(58) Field of Search ............................... 359/631, 632, 359/633, 629, 627, 625, 619

(56) References Cited

U.S. PATENT DOCUMENTS 6,510,006 B1 * 1/2003 Togino ........................ 359/631

FOREIGN PATENT DOCUMENTS

| JP | 09-061748 | 3/1997 |
| JP | 09-181999 | 7/1997 |

* cited by examiner

*Primary Examiner*—Hung Xuan Dang
(74) *Attorney, Agent, or Firm*—Pillsbury Winthrop LLP

(57) ABSTRACT

An optical path splitting element for splitting a light beam from a single object into at least two optical paths is made compact in size by using a three-dimensional optical system and given a power to reduce the number of components thereof. An image display apparatus uses the optical path splitting element. The optical path splitting element has a prism member having an entrance surface through which the light beam from the object enters the prism member, at least one reflecting surface reflecting the light beam within the prism member, and an exit surface through which the light beam exits the prism member. The prism member has at least one rotationally asymmetric surface. At least one optical functional surface is a discontinuous surface formed from at least two surfaces adjacent to each other. The other optical functional surfaces are common to the at least two optical paths.

14 Claims, 18 Drawing Sheets

OPTICAL PATH SPLITTING ELEMENT AND IMAGE DISPLAY APPARATUS USING THE SAME

This application claims benefit of Japanese Application No. 2001-127806 filed in Japan on Apr. 25, 2001, the contents of which are incorporated by this reference.

BACKGROUND OF THE INVENTION

1. Field of the Invention

The present invention relates to an optical path splitting element and an image display apparatus using the same. More particularly, the present invention relates to an optical path-splitting element for splitting a light beam from a single object into two optical paths and also relates to a head- or face-mounted image display apparatus using such an optical path splitting element.

2. Discussion of Related Art

There has heretofore been known an optical path splitting element for leading an image displayed on a single display device to both eyes of an observer, as disclosed in Japanese Patent Application Unexamined Publication Number (hereinafter referred to as "JP(A)") Hei 9-181999. This splitting element uses a single prism to split a light beam from the displayed image into two optical paths extending in different directions.

In an image display apparatus using the above-described splitting element, however, when the image display device is reduced in size, it is necessary to shorten the focal length of the optical system while ensuring the required eye relief. Therefore, it is difficult to construct a viewing optical system of wide field angle.

There has also been proposed an image display device using a half-mirror to split an optical path as disclosed in JP(A) Hei 9-061748.

In the above-described conventional optical path splitting element that splits the light beam into two optical paths extending in different directions, the size of the optical path splitting element becomes unfavorably large. Accordingly, an image display apparatus using the optical path splitting element becomes undesirably large in size and heavy in weight. The above-described conventional method of splitting an optical path by using a half-mirror suffers from the problem that the image for observation becomes unfavorably dark because the light quantity is halved for each optical path.

SUMMARY OF THE INVENTION

The present invention was made in view of the above-described problems with the prior art.

Accordingly, an object of the present invention is to provide a compact optical path splitting element having a reduced number of components and also provide an image display apparatus using the optical path splitting element. More specifically, the present invention provides an optical path splitting element having at least two split axial principal rays each extending from the center of an object to the center of an image. The optical path splitting element uses a three-dimensional optical system in which bent segments forming each of the axial principal rays lie in at least two planes, thereby making the optical path splitting element compact in size. At the same time, a power is given to the optical path splitting element to reduce the number of components thereof.

To attain the above-described object, the present invention provides an optical path splitting element for splitting a light beam from a single object into at least two optical paths. The optical path splitting element has a prism member formed from a medium having a refractive index (n) larger than 1 (n>1). The prism member has an entrance surface through which the light beam from the object enters the prism member. The prism member further has at least one reflecting surface reflecting the light beam within the prism member, and an exit surface through which the light beam exits the prism member. Moreover, the prism member has at least one rotationally asymmetric surface. At least one optical functional surface of the prism member is a discontinuous surface formed from at least two surfaces adjacent to each other. The other optical functional surfaces of the prism member are common to the at least two optical paths.

In addition, the present invention provides an image display apparatus including an optical path splitting element for splitting a light beam from a single object into at least two optical paths. The optical path splitting element has a prism member formed from a medium having a refractive index (n) larger than 1 (n>1). The prism member has an entrance surface through which the light beam from the object enters the prism member. The prism member further has at least one reflecting surface reflecting the light beam within the prism member, and an exit surface through which the light beam exits the prism member. Moreover, the prism member has at least one rotationally asymmetric surface. At least one optical functional surface of the prism member is a discontinuous surface formed from at least two surfaces adjacent to each other. The other optical functional surfaces of the prism member are common to the at least two optical paths. The image display apparatus further includes an image display device disposed at the position of the object, and an ocular optical system having at least a positive power to project the at least two optical paths split by the optical path splitting element near an eyeball of an observer.

In this case, it is desirable that the ocular optical system should have at least one rotationally asymmetric surface.

The reasons for adopting the above-described arrangements in the present invention, together with the functions thereof, will be described below.

The present invention features an optical path splitting element that splits a light beam from an object into at least two light beams and allows the light beams to exit at a desired angle and with a desired optical axis separation while performing aberration correction appropriately.

It is known that an optical system that is compact and has minimal aberrations can be constructed by using a decentered prism as an optical element.

A specific example of such an optical apparatus is shown in JP(A) 2000-221440. That is, an optical apparatus has a relay optical system for forming an observation image as a relay image and an ocular optical system for forming an exit pupil to lead the relay image to an observer. The relay optical system has a decentered prism formed from a medium having a refractive index (n) larger than 1 (n>1). The decentered prism has an entrance surface through which a light beam from an image display device enters the decentered prism. The decentered prism further has at least one reflecting surface reflecting the light beam within the decentered prism, and an exit surface through which the light beam exits the decentered prism. The at least one reflecting surface has a curved surface configuration that gives a power to the light beam. The curved surface configuration is a rotationally asymmetric surface configuration that corrects aberrations due to decentration. The ocular optical system comprises a concave mirror. The concave mirror has a rotationally asymmetric curved surface configuration that gives a power to the light beam upon reflection and corrects aberrations due to decentration.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an optical system such as a viewing optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the optical system includes a decentered prism having an entrance surface through which a light beam from an image display device enters the decentered prism. The decentered prism further has at least one reflecting surface reflecting the light beam within the decentered prism, and an exit surface through which the light beam exits the decentered prism. The at least one reflecting surface has a curved surface configuration that gives a power to the light beam. The curved surface configuration is a rotationally asymmetric surface configuration that corrects aberrations due to decentration. The optical system further includes a concave mirror having a rotationally asymmetric curved surface configuration that gives a power to the light beam upon reflection and corrects aberrations due to decentration. The decentered prism and the concave mirror are arranged to correct each other's decentration aberrations, thereby enabling not only axial aberrations but also off-axis aberrations to be favorably corrected. If only one decentered prism or only one concave mirror is used, it is impossible to correct decentration aberrations completely.

Thus, the present invention has succeeded in imparting an optical path splitting function to such a decentered prism by constructing at least one surface of the decentered prism in the form of a discontinuous surface comprising at least two surfaces adjacent to each other. The discontinuous surface can split a light beam from an object (image display device) into at least two light beams and allows aberration correction to be performed individually by the at least two optical functional surfaces and, at the same time, permits the optical axes to be separated by a desired distance and at a desired angle.

As a decentered prism employed as an optical path splitting element, it is possible to use any of publicly known various prisms in which there is at least one reflection and which has an entrance surface through which light enters the prism, at least one reflecting surface reflecting the light within the prism, and an exit surface through which the reflected light exits the prism.

In the present invention, an image display apparatus is arranged as shown in FIG. 1, which is a conceptual view. That is, the above-described optical path splitting element is used as a relay optical system 31. An image display device is placed at the object point of the relay optical system 31. An ocular optical system 32 having a positive power is disposed at the exit side of the relay optical system 31. Thus, at least two optical paths $33_1$ and $33_2$ from the image display device that are split by the relay optical system 31 are projected near an observer's eyeball by the ocular optical system 32.

With the described arrangement, the exit pupil of the relay optical system 31 is projected by the ocular optical system 32 as exit pupils $1_1$ and $1_2$ of the image display apparatus in a space corresponding to the position of an observer's eye.

By using the optical path splitting element as the relay optical system 31 in this way, the exit pupils $1_1$ and $1_2$ of the image display apparatus are split and displaced relative to each other. Thus, advantageous features such as private reading capability and high illuminating efficiency can be obtained, and it is also possible to enlarge the exit pupil of the image display apparatus.

If the image display apparatus is arranged to increase the exit pupil diameter thereof without using the optical path splitting element, the load imposed on the relay optical system for aberration correction becomes excessively heavy. Consequently, it becomes impossible for a compact relay optical system to provide an observation image favorably corrected for aberrations.

The function of the ocular optical system 32 enables the image projected by the relay optical system 31 to be supplied to an observer's eyeball without waste and also allows the projected image to be viewed with both eyes through the split optical paths $33_1$ and $33_2$. By properly adjusting the way in which the optical paths $33_1$ and $33_2$ are split, the exit pupils $1_1$ and $1_2$ of the image display apparatus can be disposed adjacent to each other. Accordingly, it is possible to provide an image display apparatus suffering no eclipse even when the observer slightly moves his/her eyeballs.

When the image display apparatus is arranged as stated above, the ocular optical system 32 is disposed at a tilt (particularly when the ocular optical system 32 is a reflecting optical system). Consequently, decentration aberrations occur to a considerable extent unfavorably. In particular, the occurrence of decentration aberrations in the projection of the pupil causes pupil aberrations. This causes an image distortion and narrows the observation area, undesirably.

Therefore, the ocular optical system 32 is arranged to have at least one rotationally asymmetric surface that corrects aberrations due to decentration, thereby enabling not only axial aberrations but also off-axis aberrations to be corrected favorably.

It is desirable to use a free-form surface as the above-described rotationally asymmetric curved surface, although the present invention is not necessarily limitative thereto. Free-form surfaces used in the present invention are defined, for example, by equation (a) shown in U.S. Pat. No. 6,124,989 [JP(A) 2000-66105]. The Z-axis of the defining equation is the axis of a free-form surface.

The ocular optical system should preferably comprise an optical element having at least a reflecting action, such as a concave mirror or a Fresnel reflecting surface. A reflecting optical element produces no chromatic aberration in theory even when a reflecting surface thereof is provided with a power, and need not add another optical element only for the purpose of correcting chromatic aberration. Accordingly, if a reflecting optical system having a reflecting action is used as the ocular optical system, it is possible to reduce the number of constituent optical elements from the viewpoint of chromatic aberration correction in comparison to an optical system using a refracting optical element.

At the same time, a reflecting optical system allows the optical system itself to be compact in size in comparison to a refracting optical system because the optical path is folded in the reflecting optical system.

An optical element having a transmission refracting action, such as a transmission lens or a transmission Fresnel lens, is also usable as an ocular optical system. It is also possible to use an optical element having a diffractive action, such as a transmission type diffractive optical element, a transmission type hologram element, a reflection type diffractive optical element, or a reflection type hologram element.

In particular, it becomes possible to construct a thin ocular optical system by using a diffractive optical element, a hologram element, a Fresnel lens, a Fresnel reflecting surface, etc.

Further, when a diffractive optical element or a hologram element is used to form the ocular optical system, directional diffusion properties can be imparted to a surface thereof. Accordingly, a light beam traveling via the ocular optical system can be diffused in two or more different directions. Thus, it is possible to enlarge the range of the exit pupil in which the image is observable.

In the arrangement as shown in FIG. 1, it is preferable to form a virtual image of each optical path near a point P of intersection between the optical axes after reflecting at the ocular optical system 32. The reason for this is as follows. When observation is performed with a single eye, if the observer's eye moves, the two optical paths $33_1$ and $33_2$ are switched from one to another. Even in such a case, the movement of the image can be minimized.

The image display apparatus can be arranged to allow the observer to see with both eyes by disposing the two optical paths $33_1$ and $33_2$ apart from each other by the distance between the two eyes (interpupillary distance) at the observation position or at the positions of the exit pupils $1_1$ and $1_2$.

As another optical path splitting method, it is possible to arrange the image display apparatus so that the two optical paths $33_1$ and $33_2$ converge, as shown in FIG. 2. When the image display apparatus is arranged so that the optical paths $33_1$ and $33_2$ intersect each other at the position of the ocular optical system 32, it is desirable that the virtual image position should also be set in the vicinity of the ocular optical system 32.

It is also possible to arrange the image display apparatus so that the two optical paths $33_1$ and $33_2$ do not intersect each other. In this case, it is desirable that the position of the virtual image should be at infinity.

FIG. 3 is a conceptual view showing an example of the above-described relay optical system (optical path splitting element) having an optical path splitting function. In this example, a decentered prism 10 constituting a relay optical system has an entrance surface 11, an exit surface 14, and two internally reflecting surfaces 12 and 13, and optical paths $33_1$ and $33_2$ from an image display device 3 substantially intersect in the optical system. The second internally reflecting surface 13 is formed from two optical surfaces $13_1$ and $13_2$. The second internally reflecting surface 13 is a discontinuous surface because the two optical surfaces $13_1$ and $13_2$ are disposed at different positions.

It is preferable that a surface near the pupil position in the relay optical system 31 should be such a discontinuous surface formed from at least two optical surfaces. If such a discontinuous surface is disposed near the pupil, when an observer's eye is placed where at least two exit pupils of the image display apparatus are formed, switching between the pupils caused by the movement of the eye takes place simultaneously over the entire image field. Therefore, it is possible to prevent the observer from feeling incongruous.

Incidentally, various arrangements are available for the discontinuous surface of the optical path splitting element constituting the relay optical system 31, which is formed from at least two optical surfaces disposed adjacent to each other. That is, the discontinuous surface can be formed by arranging a plurality of optical surfaces either horizontally or vertically. Further, it is possible to use various arrangements such as those shown in FIGS. 4(a) to 4(d), by way of example. FIG. 4(a) shows a layout in which two optical surfaces $S_1$ and $S_2$ are arranged horizontally. FIG. 4(b) shows a layout in which two optical surfaces $S_1$ and $S_2$ are arranged vertically. FIG. 4(c) shows a layout in which four optical surfaces $S_1$, $S_2$, $S_3$, and $S_4$ are arranged both vertically and horizontally. FIG. 4(d) shows a layout in which a large number of regular hexagonal optical surfaces $S_1$ to $S_{11}$ are arranged densely.

Incidentally, it is desirable in an image display apparatus such as that shown in FIG. 1 that a mechanism for moving the image display device 3 (see FIG. 3) in the optical axis direction should be provided to move the position of a first image projected by the relay optical system 31, thereby allowing the position of a virtual image formed by the ocular optical system 32 to be moved from infinity to the vicinity of the ocular optical system 32. Such a mechanism makes it possible to adjust the virtual image position according to each individual observer's preference. Thus, it becomes possible for any of shortsighted, farsighted and presbyopic persons to select an easy-to-see image position.

Another arrangement of the image display apparatus according to the present invention is shown in FIG. 5. The portability of the image display apparatus when not in use is improved by arranging it so that the ocular optical system 32 is openable from the body 30 or accommodable in the body 30. In such a case, when the ocular optical system 32 is closed as shown in FIG. 5, the image display apparatus can be used as a projector for projecting an image on a wall surface 54 or the like. In this case, the image display apparatus needs a mechanism for moving the image display device to make the position of the projected image coincident with the wall surface 54. When the brightness of the projection display apparatus is insufficient, the image display apparatus may be arranged, as shown in FIG. 6(b), so that an external light source unit 38 can be attached to the lower side of the body 30, for example, to illuminate the image display device 3 from the rear thereof with illuminating light from an external light source 39 in the external light source unit 38 in a state where a built-in light source 37, which is normally used to observe through the ocular optical system 32 as shown in FIG. 6(a), has been moved from the working position to a position outside the working position as shown by the arrow in FIG. 6(b). In the case of FIG. 6(b), the image display device 3 is movable in the direction of the arrow toward the decentered prism 10 constituting the relay optical system 31 to effect focusing.

The image display apparatus according to the present invention is not necessarily limited to the above-described portable form but may be constructed in the form of a portable viewer type image display apparatus as shown in FIG. 7. In addition, the image display apparatus according to the present invention can be arranged to display not only an electronic image displayed on the image display device but also an aerial image formed through an objective lens or the like as an object point.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Next, Examples 1 to 3 of an optical system used in an image display apparatus according to the present invention will be described.

Figure 1:
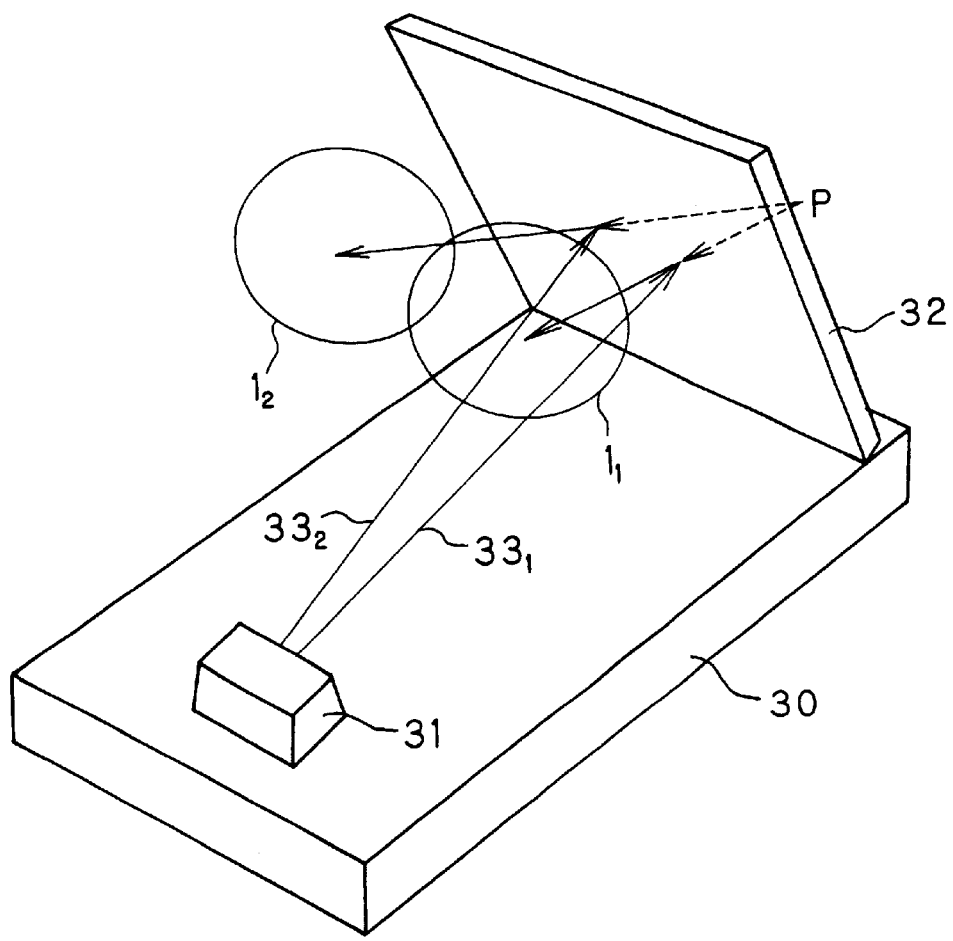
FIG. 1 is a conceptual view of an image display apparatus using an optical path splitting element according to the present invention as a relay optical system.
Figure 2:
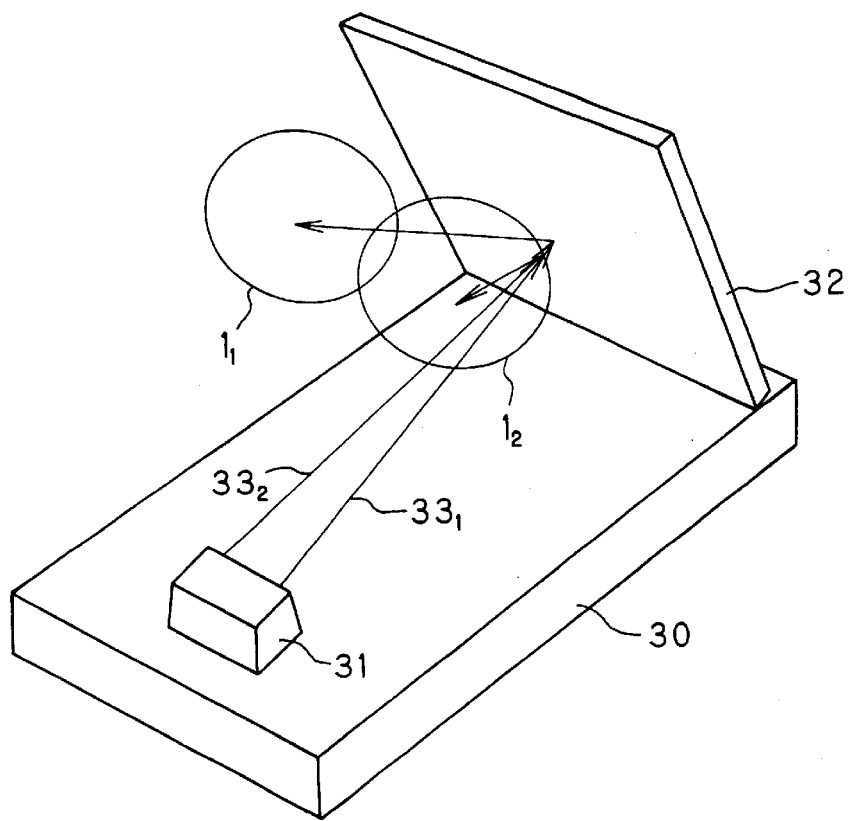
FIG. 2 is a diagram for describing another optical path splitting method usable in an image display apparatus according to the present invention.
Figure 3:
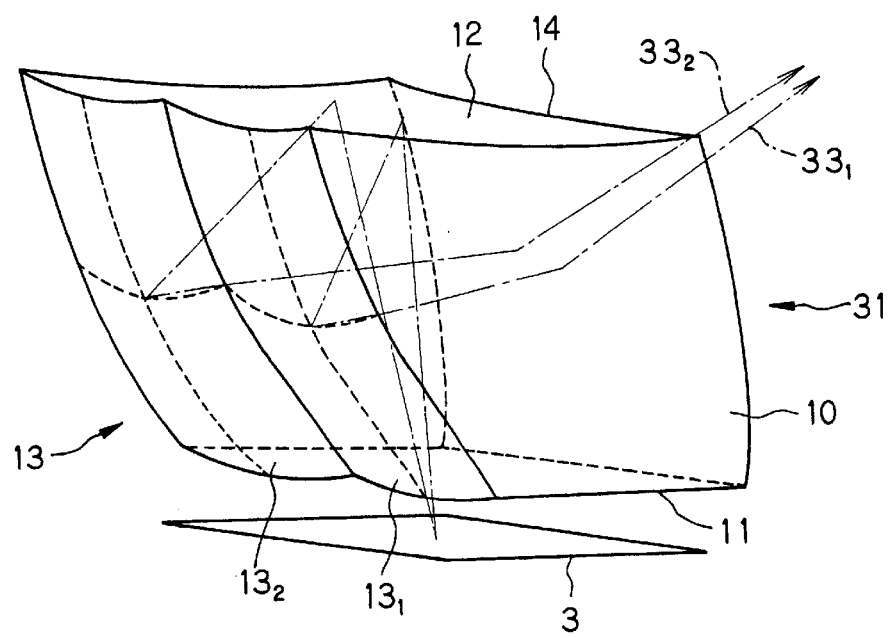
FIG. 3 is a conceptual view showing an example of a relay optical system (optical path splitting element) usable in an image display apparatus according to the present invention.
Figure 4A:
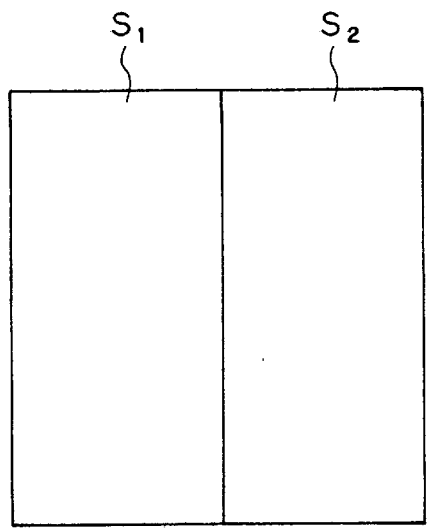
FIGS. 4(a) to 4(d) are diagrams showing examples of the arrangement of two or more optical surfaces for forming a discontinuous surface of an optical path splitting element.
Figure 4B:
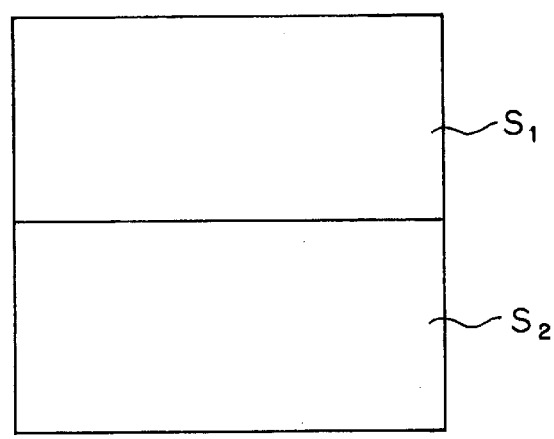
Figure 4C:
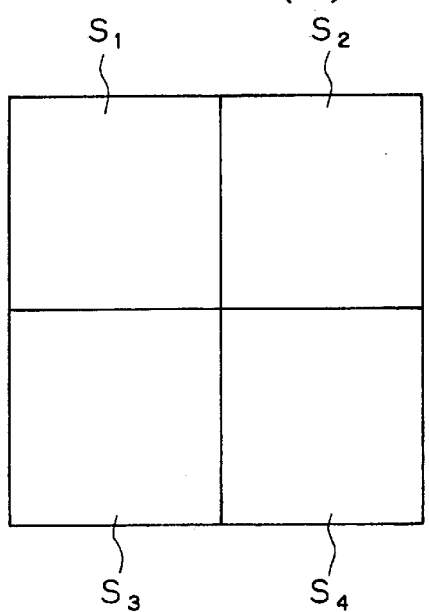
Figure 4D:
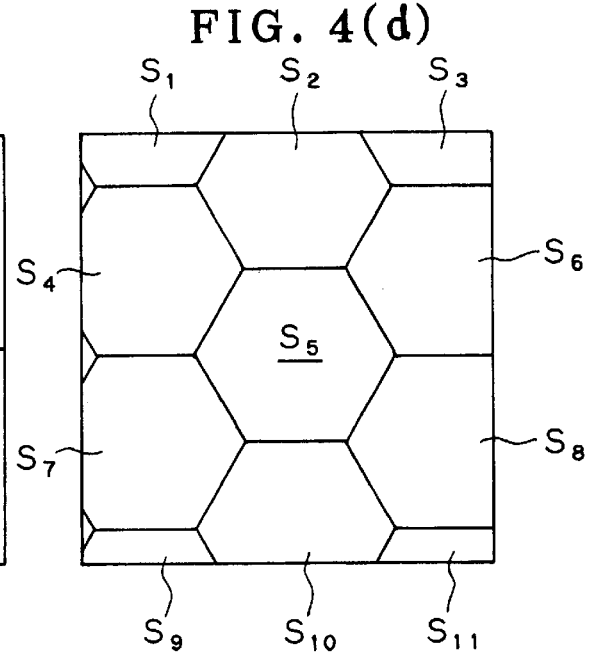
Figure 5:
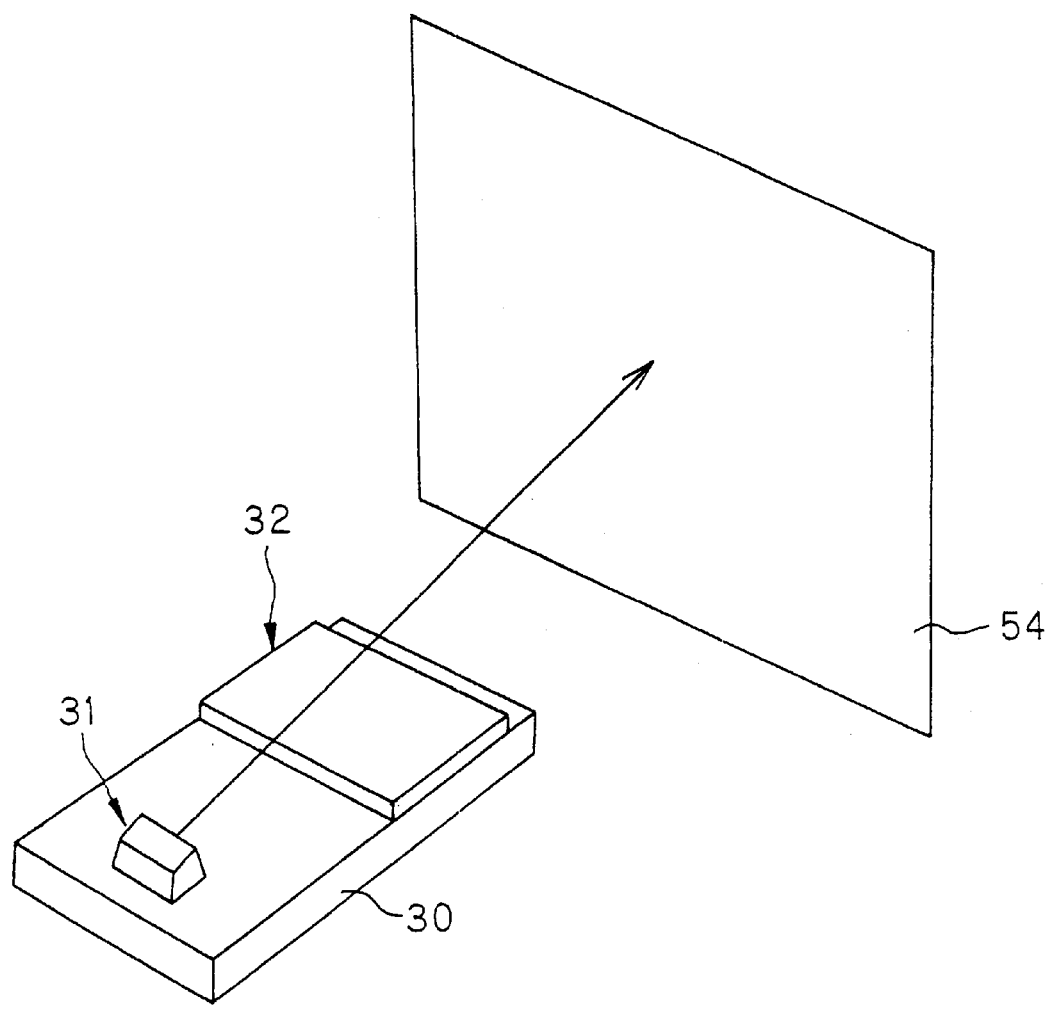
FIG. 5 is a diagram for describing an arrangement in which an image display apparatus according to the present invention is usable as a projector.
Figure 6A:
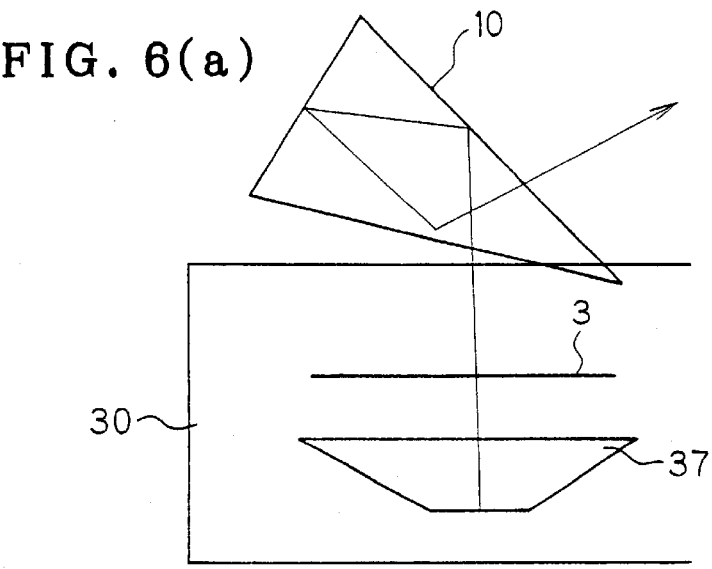
FIGS. 6(a) and 6(b) are diagrams for describing an image display apparatus according to the present invention in which an external light source unit is usable.
Figure 6B:
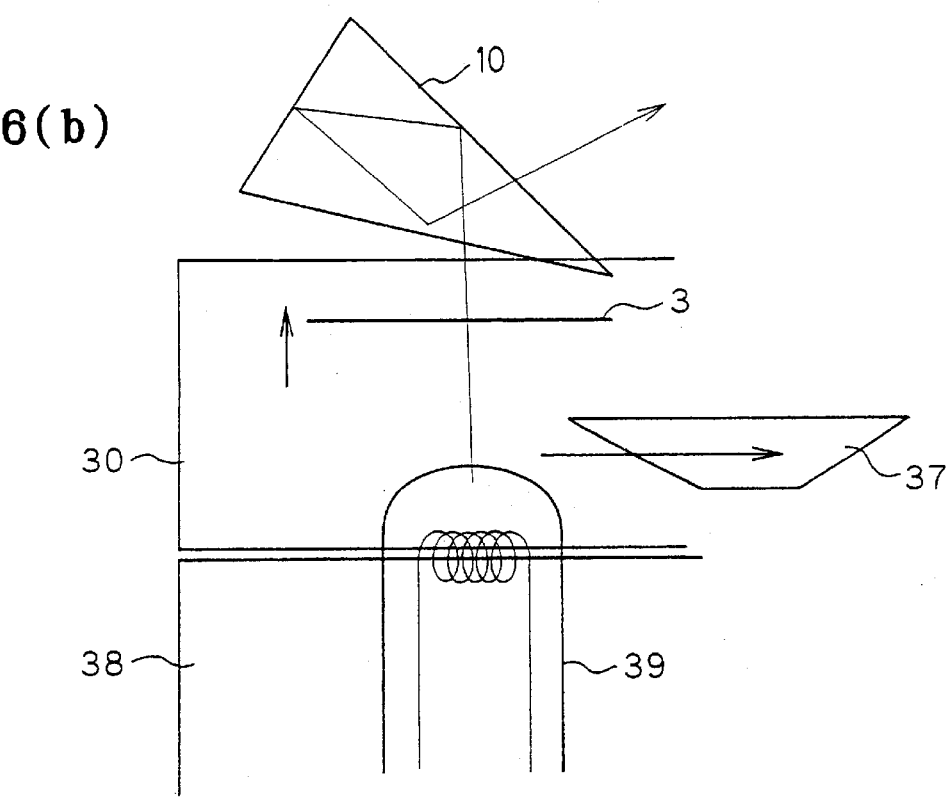
Figure 7:
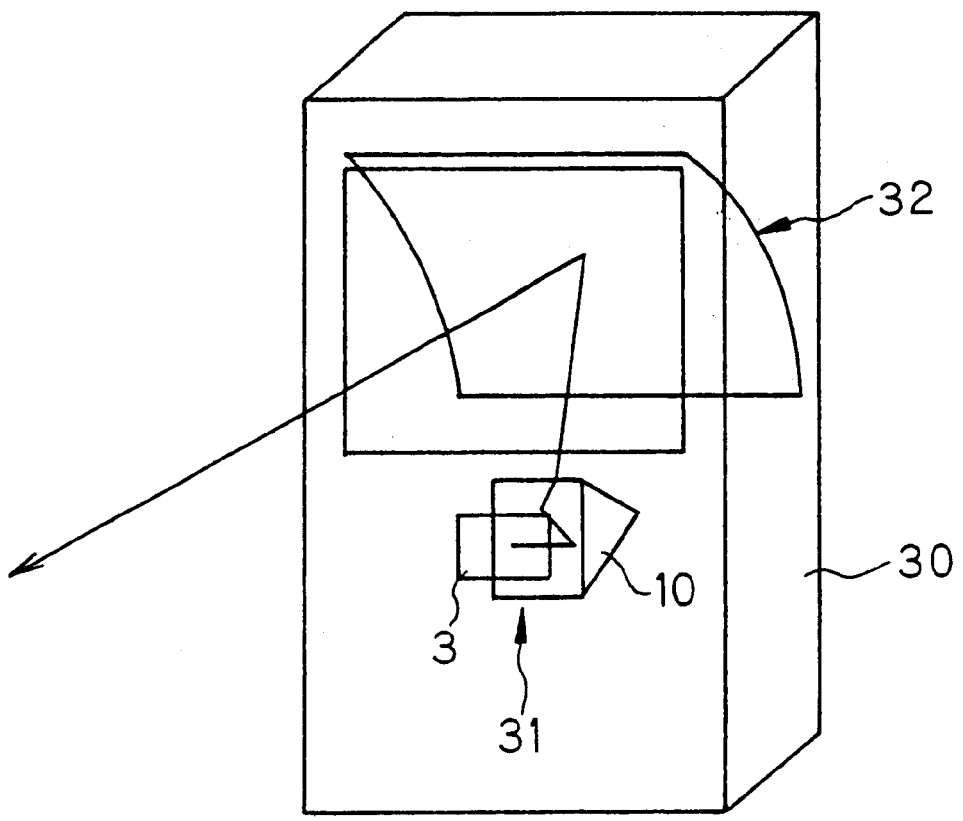
FIG. 7 is a diagram for describing an image display apparatus according to the present invention as arranged in the form of a portable viewer type image display apparatus.

Constituent parameters in Examples 1 to 3 will be shown later. A coordinate system used in these examples is defined as follows. As shown in FIGS. 8 to 19, a plane that passes through the center between two exit pupils $1_1$ and $1_2$ (see FIG. 1; observer's pupils) perpendicularly to a straight line connecting the respective centers of the exit pupils $1_1$ and $1_2$ and that constitutes a plane of symmetry of the optical system is defined as a reference plane. The center of one exit pupil $1_1$ of the two is defined as the origin of the optical system. The direction of an axis extending perpendicularly through the center of the exit pupil $1_1$ along the reference plane is defined as a Z-axis direction. The direction in which the Z-axis extends from the exit pupil $1_1$ toward the ocular optical system 32 is defined as a positive direction of the Z-axis. The direction of an axis extending perpendicularly to the Z-axis along the reference plane is defined as a Y-axis direction. The direction in which the Y-axis extends toward a side where the image display device 3 is located is defined as a negative direction of the Y-axis. The direction of an axis perpendicularly intersecting the YZ-plane is defined as an X-axis direction. The direction in which the X-axis constitutes a right-handed orthogonal coordinate system in combination with the Y- and Z-axes is defined as a positive direction of the X-axis.

Regarding decentered surfaces, each surface is given displacements in the X-, Y- and Z-axis directions (X, Y and Z, respectively) of the vertex position of the surface from the origin of the optical system, together with tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, the positive $\alpha$ and $\beta$ mean counterclockwise rotation relative to the positive directions of the corresponding axes, and the positive $\gamma$ means clockwise rotation relative to the positive direction of the Z-axis. It should be noted that the way of rotating the center axis of each surface through $\alpha$, $\beta$ and $\gamma$ is as follows. First, the center axis of the surface and the XYZ orthogonal coordinate system are rotated through $\alpha$ counterclockwise about the X-axis. Then, the rotated center axis of the surface is rotated through $\beta$ counterclockwise about the Y-axis of the new coordinate system, and the coordinate system once rotated is also rotated through $\beta$ counterclockwise about the Y-axis. Then, the center axis of the surface, which has been rotated twice, is rotated through y clockwise about the Z-axis of the new coordinate system.

The surface configuration of free-form surfaces used in the present invention is defined, for example, by equation (a) shown in U.S. Pat. No. 6,124,989 [JP(A) 2000-66105]. The Z-axis of the defining equation is the axis of a free-form surface.

In the constituent parameters (shown later), those terms concerning free-form surfaces for which no data is shown are zero. The refractive index is expressed by the refractive index for the spectral d-line (wavelength: 587.56 nanometers). Lengths are given in millimeters.

Numerical data concerning Examples 1 to 3 (described below) is shown on the basis of backward ray tracing from one exit pupil $1_1$ to the image display device 3.

In Example 1, the viewing field angles are as follows. The horizontal field angle is 8°, and the vertical field angle is 6°. The pupil diameter is 12 millimeters. The distance from the exit pupil $1_1$ ($1_2$) corresponding to the position of an observer's eyeball to the image is 1 meter. An image display device 3 having a size of 4.8×3.6 millimeters is used.

Figure 8:
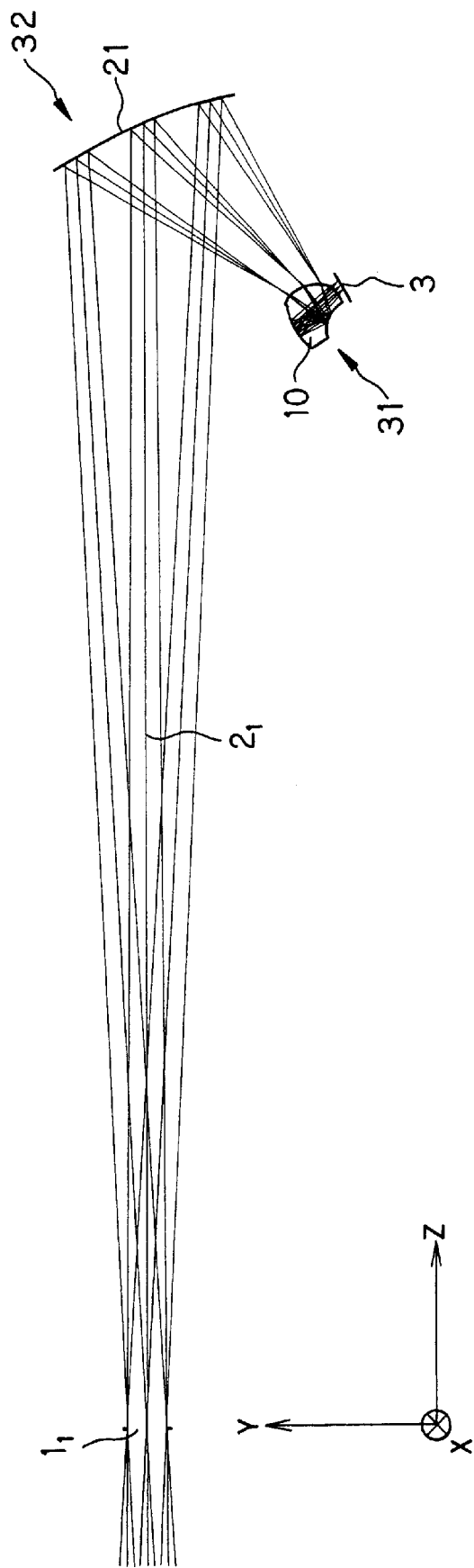
FIG. 8 is an optical path diagram showing an optical system of an image display apparatus according to Example 1 of the present invention projected onto a YZ-plane.
Figure 9:
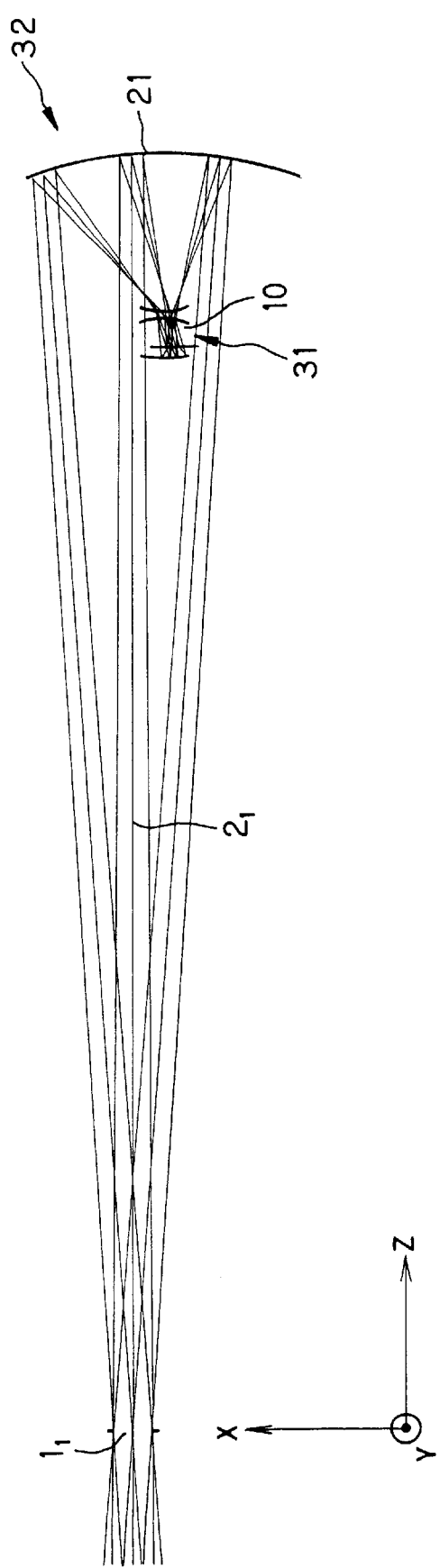
FIG. 9 is an optical path diagram showing the optical system of the image display apparatus according to Example 1 of the present invention projected onto an XZ-plane.
Figure 10:
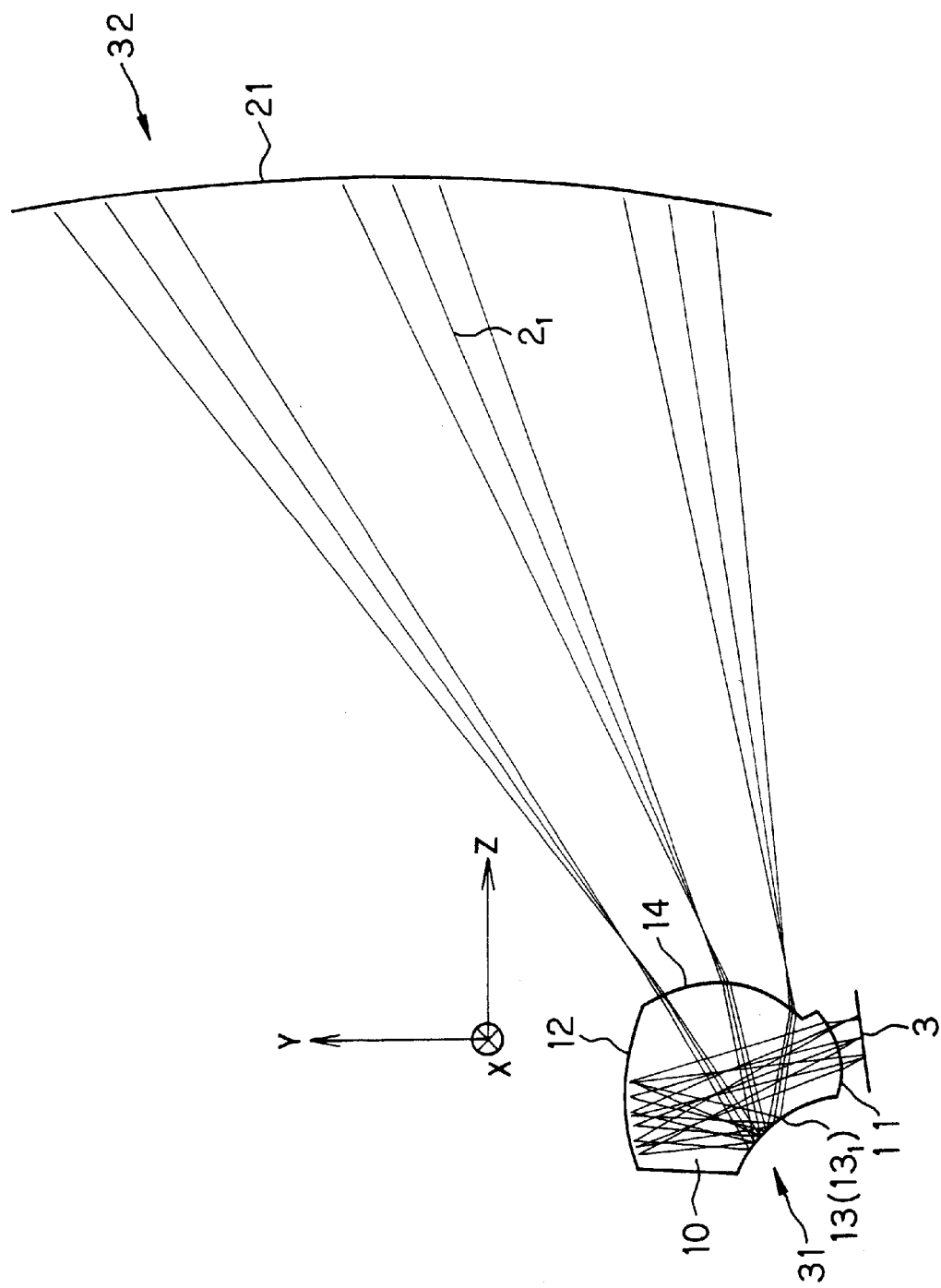
FIG. 10 is an enlarged optical path diagram of Example 1 as shown in FIG. 8, in which the illustration of optical paths leading to exit pupils is omitted.
Figure 11:
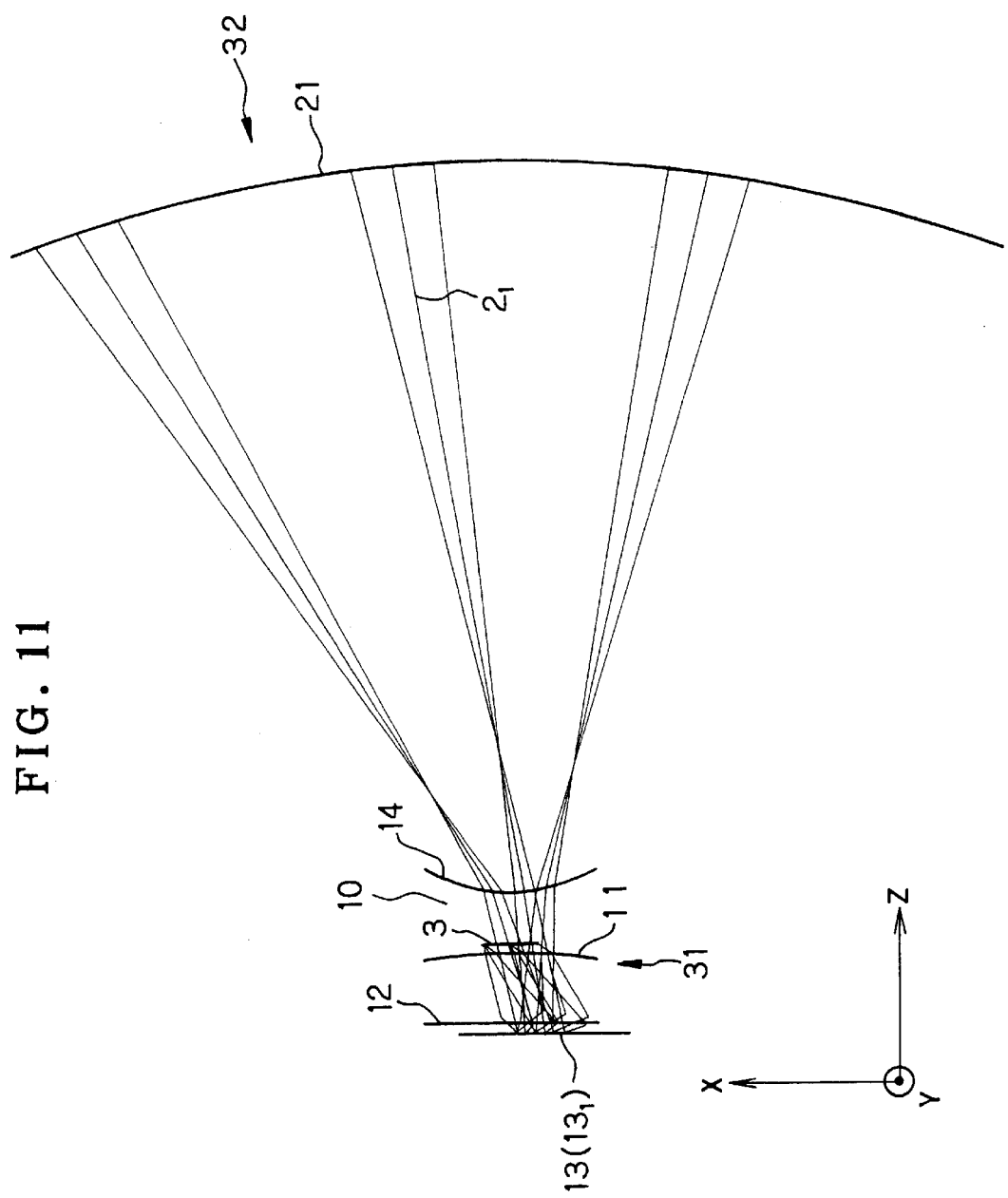
FIG. 11 is an enlarged optical path diagram of Example 1 as shown in FIG. 9, in which the illustration of optical paths leading to exit pupils is omitted.

FIG. 8 is an optical path diagram showing Example 1 projected onto the YZ-plane. FIG. 9 is an optical path diagram showing Example 1 projected onto the XZ-plane. FIG. 10 is an enlarged optical path diagram of Example 1 as shown in FIG. 8, in which the illustration of optical paths leading to exit pupils is omitted. FIG. 11 is an enlarged optical path diagram of Example 1 as shown in FIG. 9, in which the illustration of optical paths leading to exit pupils is omitted.

Numerical data (shown later) is data obtained by backward ray tracing from one exit pupil $1_1$ to the image display device 3. The other exit pupil $1_2$ has its center located at the following coordinate position:

| X | −20.00 | Y | 0.00 | Z | 0.00 |
|---|---|---|---|---|---|
| $\alpha$ | 0.50 | $\beta$ | 0.00 | $\gamma$ | 0.00 |

The image display device 3 has its display center located at the following coordinate position:

| X | −10.00 | Y | −61.43 | Z | 350.54 |
|---|---|---|---|---|---|
| $\alpha$ | 120.00 | $\beta$ | 0.00 | $\gamma$ | 0.00 |

Two optical axes from the center of the image display device 3 are split into two optical paths by the optical system. The optical axes $2_1$ and $2_2$ extending toward the exit pupils $1_1$ and $1_2$ are parallel to each other (illustration of the exit pupil $1_2$ and the optical axis $2_2$ is omitted).

In this example, a third surface 13 (surface No. 4 in the numerical data) of a decentered prism 10 constituting a relay optical system 31 is a plane-symmetry discontinuous surface that is in symmetry with respect to the plane of symmetry (reference plane) of the optical system, which passes through the position of X=−10 millimeters. In the numerical data, the surface configuration of only one surface $13_1$ that participates in the formation of one exit pupil $1_1$ is shown. The surface $13_1$ is provided on the negative side of the X-axis with respect to the plane of symmetry (reference plane). The other surface $13_2$, which is in plane symmetric relation to the surface $13_1$, is provided on the positive side of the X-axis relative to the plane of symmetry (reference plane; in FIGS. 8 to 11, only the surface $13_1$ is illustrated) Thus, the third surface 13 is formed in the shape of a discontinuous surface consisting of two optical surfaces $13_1$ and $13_2$ that are in symmetry with respect to the plane of symmetry, thereby making it possible to form an optical system with two exit pupils $1_1$ and $1_2$ having a pupil diameter of 12 millimeters and away from each other by 20 millimeters at equidistance from the plane of symmetry (reference plane) of the optical system in this example.

In the optical system of Example 1, as shown in FIGS. 8 to 11, the ocular optical system 32 facing the exit pupil $1_1$ ($1_2$) comprises a concave mirror 21, and the relay optical system 31 facing the image display device 3 comprises a decentered prism 10. The decentered prism 10 in this example includes a first surface 11 facing the image display device 3, a fourth surface 14 facing the concave mirror 21, and two reflecting surfaces, i.e. a second surface 12 and a third surface 13, which are disposed between the first surface 11 and the fourth surface 14. As stated above, the third surface 13 is formed from two optical surfaces $13_1$ and $13_2$ (illustration of the surface $13_2$ is omitted) constituting a plane-symmetry discontinuous surface that is in symmetry with respect to the plane of symmetry (reference plane) of the optical system.

In this example, a light beam from the image display device 3 enters the decentered prism 10 while being refracted through the first surface 11 and is internally reflected by the second surface 12. The reflected light is incident on the third surface 13 and reflected by the two surfaces $13_1$ and $13_2$ as light beams travelling along respective optical paths. The reflected light beams exit the decentered prism 10 while being refracted through the fourth surface 14. The two light beams are reflected by the concave mirror 21 and enter the exit pupils $1_1$ and $1_2$ separate from each other to form a virtual image at a distance of 1 meter from the position of each exit pupil. It should be noted that an intermediate image of the image display device 3 is formed outside near the fourth surface 14 by the decentered prism 10.

In this example, the concave mirror 21 and the first to fourth surfaces 11 to 14 of the decentered prism 10 are all formed from free-form surfaces.

In Example 2, the viewing field angles are as follows. The horizontal field angle is 8°, and the vertical field angle is 6°. The pupil diameter is 15 millimeters. The distance from the exit pupil $1_1$ ($1_2$) corresponding to the position of an observer's eyeball to the image is 1 meter. An image display device 3 having a size of 4.8×3.6 millimeters is used.

Figure 12:
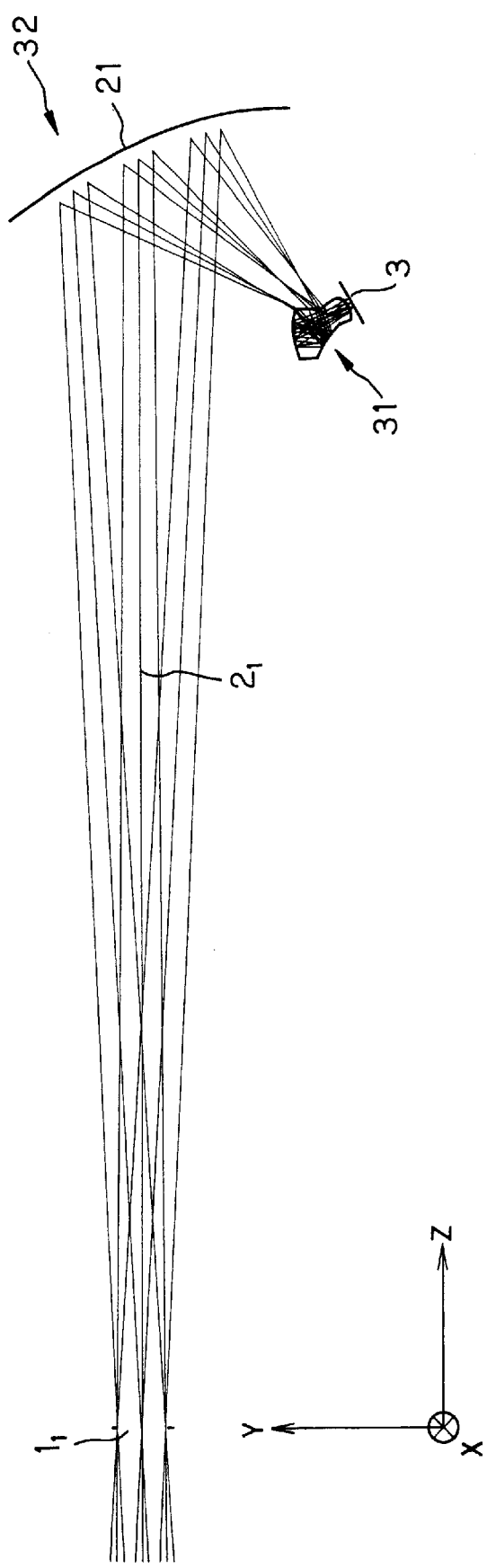
FIG. 12 is an optical path diagram showing an optical system of an image display apparatus according to Example 2 of the present invention projected onto a YZ-plane.
Figure 13:
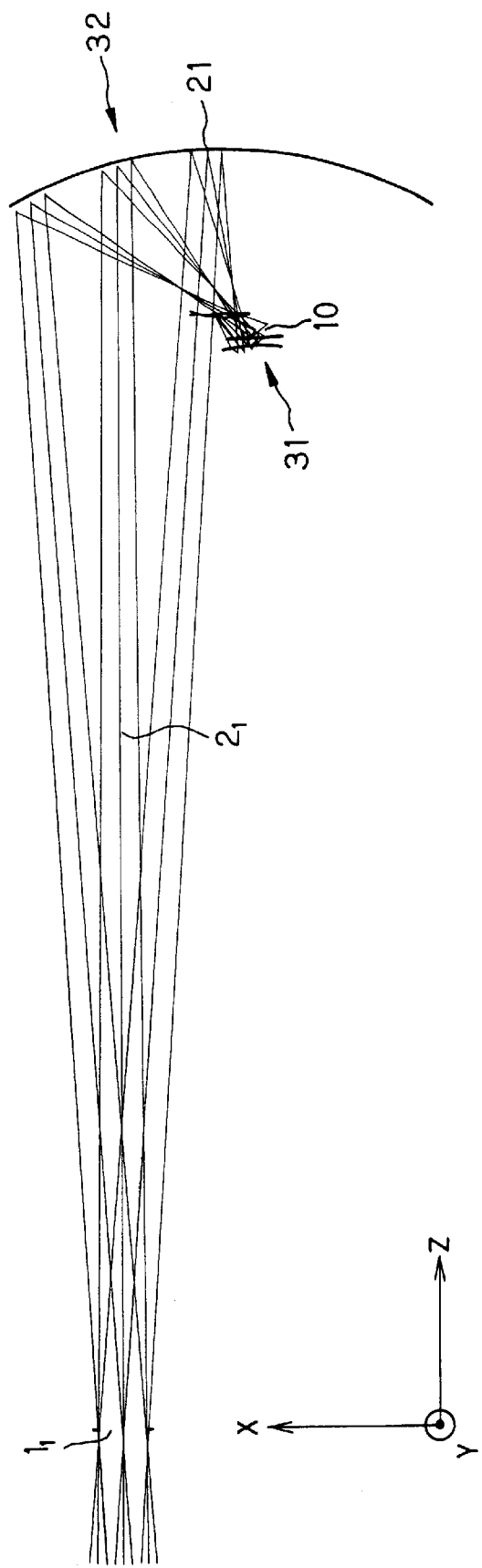
FIG. 13 is an optical path diagram showing the optical system of the image display apparatus according to Example 2 of the present invention projected onto an XZ-plane.
Figure 14:
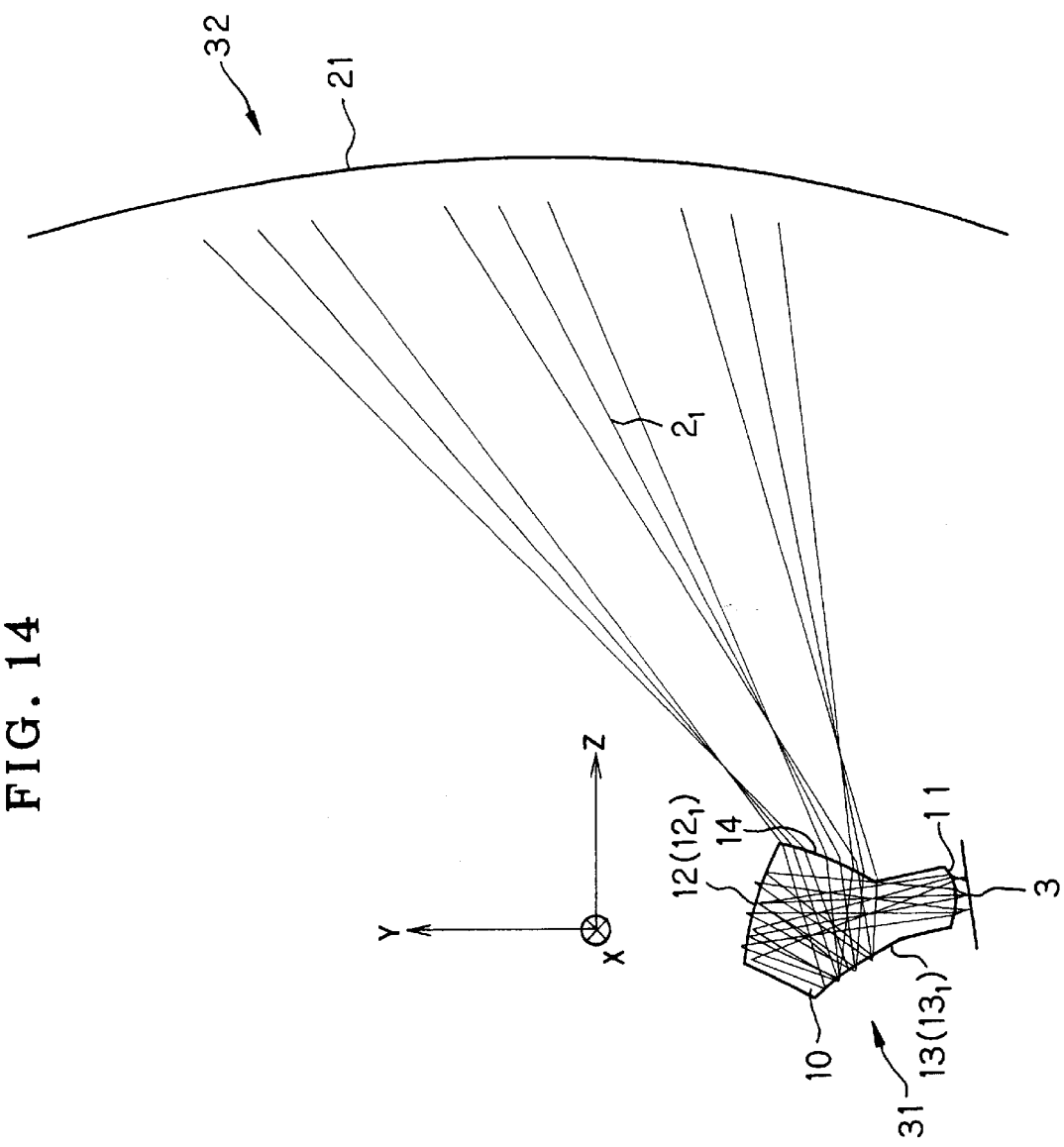
FIG. 14 is an enlarged optical path diagram of Example 2 as shown in FIG. 12, in which the illustration of optical paths leading to exit pupils is omitted.
Figure 15:
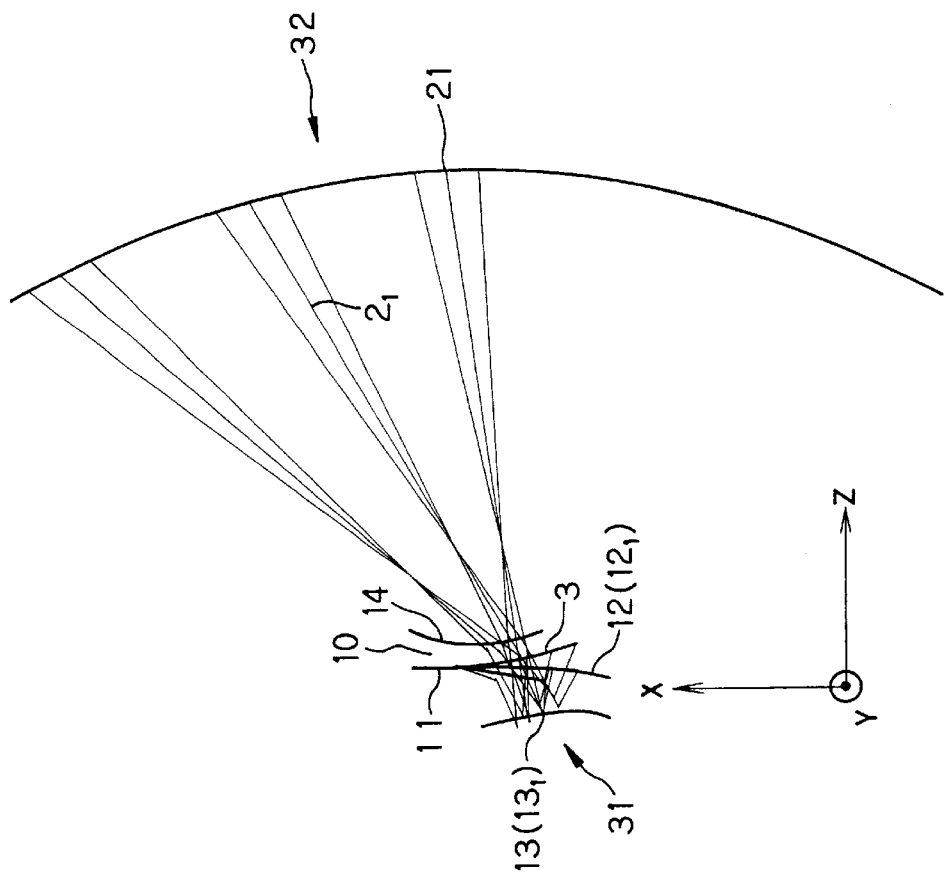
FIG. 15 is an enlarged optical path diagram of Example 2 as shown in FIG. 13, in which the illustration of optical paths leading to exit pupils is omitted.

FIG. 12 is an optical path diagram showing Example 2 projected onto the YZ-plane. FIG. 13 is an optical path diagram showing Example 2 projected onto the XZ-plane. FIG. 14 is an enlarged optical path diagram of Example 2 as shown in FIG. 12, in which the illustration of optical paths leading to exit pupils is omitted. FIG. 15 is an enlarged optical path diagram of Example 2 as shown in FIG. 13, in which the illustration of optical paths leading to exit pupils is omitted.

Numerical data (shown later) is data obtained by backward ray tracing from one exit pupil $1_1$ to the image display device 3. The other exit pupil $1_2$ has its center located at the following coordinate position:

| X | −64.00 | Y | 0.00 | Z | 0.00 |
|---|---|---|---|---|---|
| α | 0.50 | β | 0.00 | γ | 0.00 |

The image display device 3 has its display center located at the following coordinate position:

| X | −32.00 | Y | −66.27 | Z | 350.00 |
|---|---|---|---|---|---|
| α | 120.00 | β | 0.00 | γ | 0.00 |

Two optical axes from the center of the image display device 3 are split into two optical paths by the optical system. The optical axes $2_1$ and $2_2$ extending toward the exit pupils $1_1$ and $1_2$ are parallel to each other (illustration of the exit pupil $1_2$ and the optical axis $2_2$ is omitted).

In this example, a second surface 12 and a third surface 13 (surface Nos. 5 and 4 in the numerical data) of a decentered prism 10 constituting a relay optical system 31 are plane-symmetry discontinuous surfaces, each of which is in symmetry with respect to the plane of symmetry (reference plane) of the optical system, which passes through the position of X=−32 millimeters. In the numerical data, the surface configurations of only surfaces $12_1$ and $13_1$ that participate in the formation of one exit pupil $1_1$ are shown. The surfaces $12_1$ and $13_1$ are provided on the negative side of the X-axis with respect to the plane of symmetry (reference plane). The other surfaces $12_2$ and $13_2$, which are in plane symmetric relation to the surfaces $12_1$ and $13_1$, are provided on the positive side of the X-axis relative to the plane of symmetry (reference plane; in FIGS. 12 to 15, only the surfaces $12_1$ and $13_1$ are illustrated). Thus, the second and third surfaces 12 and 13 are each formed in the shape of a discontinuous surface consisting of two optical surfaces $12_1$ and $12_2$ ($13_1$ and $13_2$) that are in symmetry with respect to the plane of symmetry, thereby making it possible to form an optical system with two exit pupils $1_1$ and $1_2$ having a pupil diameter of 15 millimeters and away from each other by 64 millimeters at equidistance from the plane of symmetry (reference plane) of the optical system in this example. Consequently, it is possible to construct an image display apparatus allowing observation of the image of a single image display device 3 with both eyes.

In the optical system of Example 2, as shown in FIGS. 12 to 15, the ocular optical system 32 facing the exit pupil $1_1$ ($1_2$) comprises a concave mirror 21, and the relay optical system 31 facing the image display device 3 comprises a decentered prism 10. The decentered prism 10 in this example includes a first surface 11 facing the image display device 3, a fourth surface 14 facing the concave mirror 21, and two reflecting surfaces, i.e. a second surface 12 and a third surface 13, which are disposed between the first surface 11 and the fourth surface 14. As stated above, the second surface 12 is formed from two optical surfaces $12_1$ and $12_2$ (illustration of the surface $12_2$ is omitted) constituting a plane-symmetry discontinuous surface that is in symmetry with respect to the plane of symmetry (reference plane) of the optical system, and the third surface 13 is also formed from two optical surfaces $13_1$ and $13_2$ (illustration of the surface $13_2$ is omitted) constituting a plane-symmetry discontinuous surface that is in symmetry with respect to the plane of symmetry (reference plane) of the optical system.

In this example, a light beam from the image display device 3 enters the decentered prism 10 while being refracted through the first surface 11. The light beam is incident on the second surface 12 and reflected by the two surfaces $12_1$ and $12_2$ as light beams travelling along respective optical paths. The reflected light beams are respectively incident on the two surfaces $13_1$ and $13_2$ of the third surface 13 and reflected thereby to exit the decentered prism 10 while being refracted through the fourth surface 14. The two light beams are reflected by the concave mirror 21 and enter the exit pupils $1_1$ and $1_2$ separate from each other to form a virtual image at a distance of 1 meter from the position of each exit pupil. It should be noted that an intermediate image of the image display device 3 is formed outside near the fourth surface 14 by the decentered prism 10.

In this example, the concave mirror 21 and the first to fourth surfaces 11 to 14 of the decentered prism 10 are all formed from free-form surfaces.

In Example 3, the viewing field angles are as follows. The horizontal field angle is 8°, and the vertical field angle is 6°. The pupil diameter is 12 millimeters. The distance from the exit pupil $1_1$ ($1_2$) corresponding to the position of an observer's eyeball to the image is 400 millimeters. An image display device 3 having a size of 4.8×3.6 millimeters is used.

Figure 16:
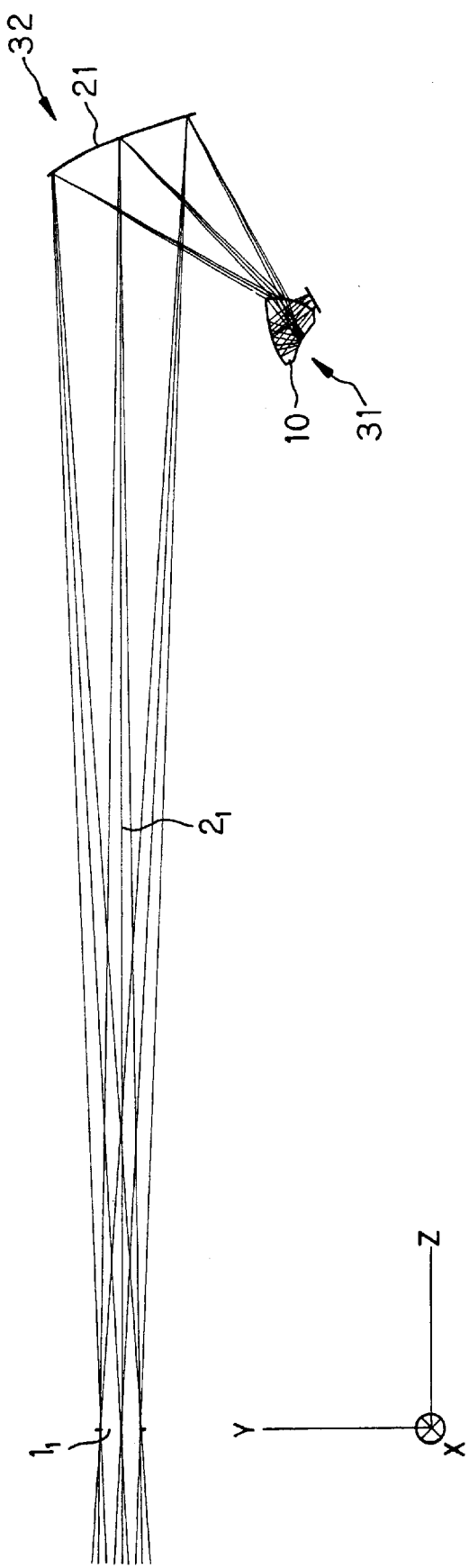
FIG. 16 is an optical path diagram showing an optical system of an image display apparatus according to Example 3 of the present invention projected onto a YZ-plane.
Figure 17:
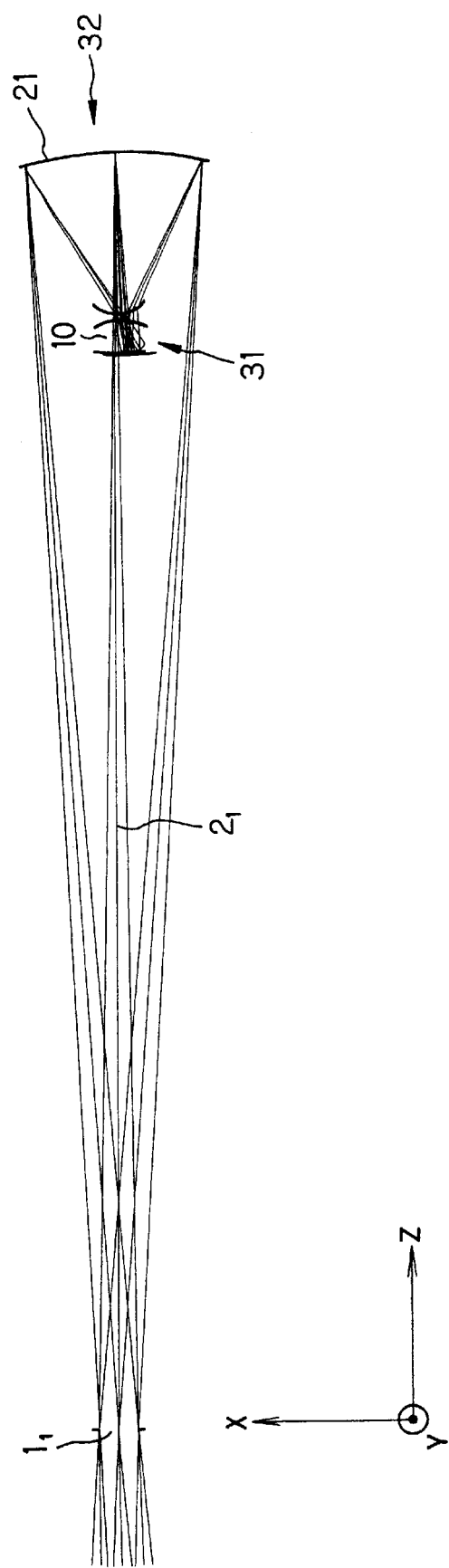
FIG. 17 is an optical path diagram showing the optical system of the image display apparatus according to Example 3 of the present invention projected onto an XZ-plane.
Figure 18:
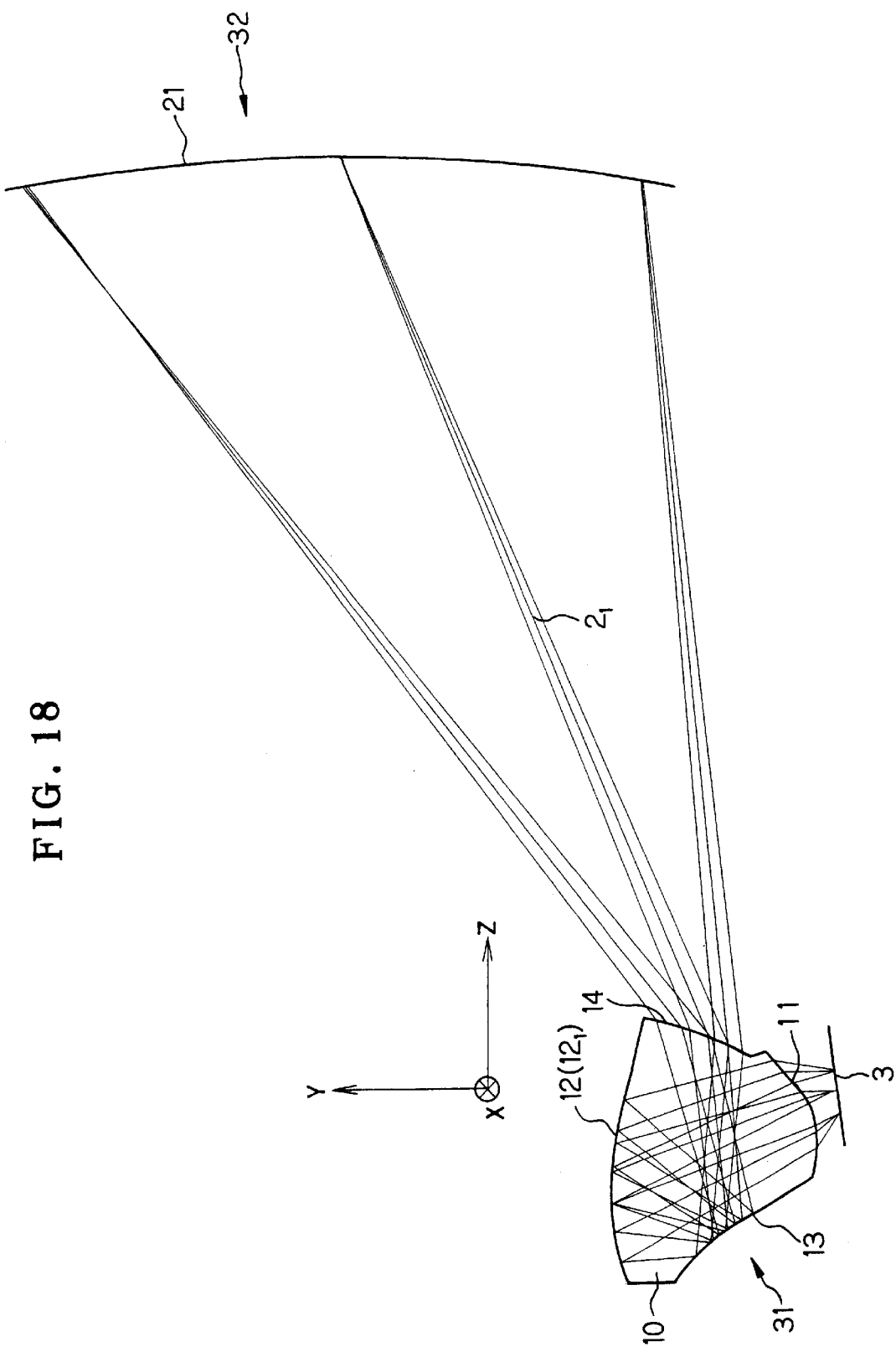
FIG. 18 is an enlarged optical path diagram of Example 3 as shown in FIG. 16, in which the illustration of optical paths leading to exit pupils is omitted.
Figure 19:
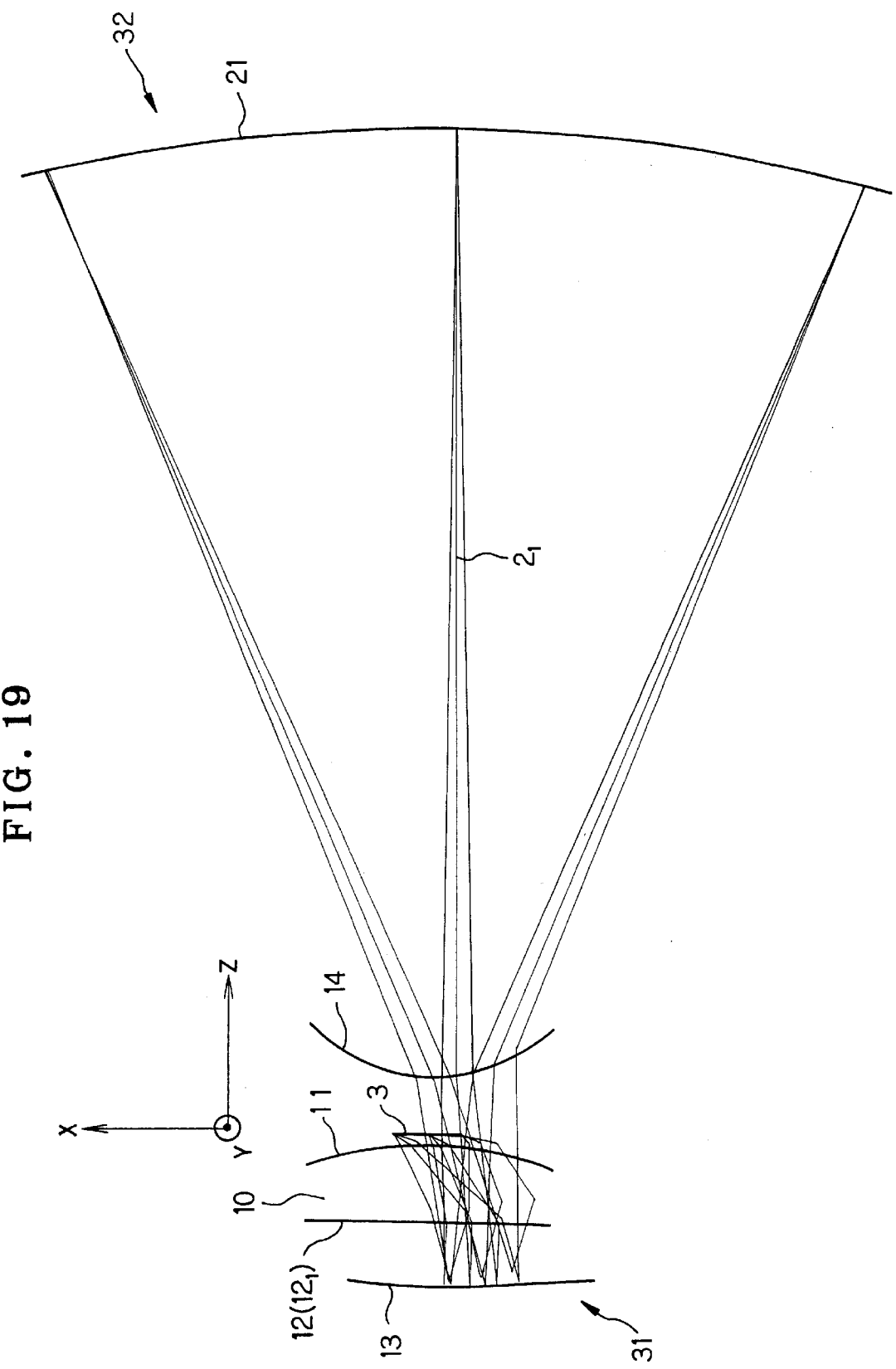
FIG. 19 is an enlarged optical path diagram of Example 3 as shown in FIG. 17, in which the illustration of optical paths leading to exit pupils is omitted.

FIG. 16 is an optical path diagram showing Example 3 projected onto the YZ-plane. FIG. 17 is an optical path diagram showing Example 3 projected onto the XZ-plane. FIG. 18 is an enlarged optical path diagram of Example 3 as shown in FIG. 16, in which the illustration of optical paths leading to exit pupils is omitted. FIG. 19 is an enlarged optical path diagram of Example 3 as shown in FIG. 17, in which the illustration of optical paths leading to exit pupils is omitted.

Numerical data (shown later) is data obtained by backward ray tracing from one exit pupil $1_1$ to the image display device 3. The other exit pupil $1_2$ has its center located at the following coordinate position:

| X | −20.00 | Y | 0.00 | Z | 0.00 |
|---|---|---|---|---|---|
| α | 0.50 | β | 0.00 | γ | 0.00 |

The image display device 3 has its display center located at the following coordinate position:

| X | −10.00 | Y | −60.19 | Z | 350.00 |
|---|---|---|---|---|---|
| α | 120.00 | β | 0.00 | γ | 0.00 |

Two optical axes $2_1$ and $2_2$ from the center of the image display device 3 are split into two optical paths by the decentered prism 10 constituting the relay optical system 31 of this optical system. The optical axes $2_1$ and $2_2$ are incident convergently on the surface of the concave mirror 21 constituting the ocular optical system 32. After intersecting each other at the surface of the concave mirror 21, the optical axes $2_1$ and $2_2$ are divergently reflected by the concave mirror 21 to extend toward the exit pupils $1_1$ and $1_2$. In the backward ray tracing, the optical axes $2_1$ and $2_2$ from the exit pupils $1_1$ and $1_2$ converge toward the concave mirror 21 and intersect each other at the surface of the concave mirror 21.

In this example, a second surface 12 (surface No. 5 in the numerical data) of the decentered prism 10 constituting the relay optical system 31 is a plane-symmetry discontinuous surface that is in symmetry with respect to the plane of symmetry (reference plane) of the optical system, which passes through the position of X=−10 millimeters. In the numerical data, the surface configuration of only one surface $12_1$ that participates in the formation of one exit pupil $1_1$ is shown. The surface $12_1$ is provided on the negative side of the X-axis with respect to the plane of symmetry (reference plane). The other surface $12_2$, which is in plane symmetric relation to the surface $12_1$, is provided on the positive side of the X-axis relative to the plane of symmetry (reference plane; in FIGS. 16 to 19, only the surface $12_1$ is illustrated) Thus, the second surface 12 is formed in the shape of a discontinuous surface consisting of two optical surfaces $12_1$ and $12_2$ that are in symmetry with respect to the plane of symmetry, thereby making it possible to form an optical system with two exit pupils $1_1$ and $1_2$ having a pupil diameter of 12 millimeters and away from each other by 20 millimeters at equidistance from the plane of symmetry (reference plane) of the optical system in this example.

In the optical system of Example 3, as shown in FIGS. 16 to 19, the ocular optical system 32 facing the exit pupil $1_1$ ($1_2$) comprises a concave mirror 21, and the relay optical system 31 facing the image display device 3 comprises a decentered prism 10. The decentered prism 10 in this example includes a first surface 11 facing the image display device 3, a fourth surface 14 facing the concave mirror 21, and two reflecting surfaces, i.e. a second surface 12 and a third surface 13, which are disposed between the first surface 11 and the fourth surface 14. As stated above, the second surface 12 is formed from two surfaces $12_1$ and $12_2$ (illustration of the surface $12_2$ is omitted) constituting a plane-symmetry discontinuous surface that is in symmetry with respect to the plane of symmetry (reference plane) of the optical system.

In this example, a light beam from the image display device 3 enters the decentered prism 10 while being refracted through the first surface 11. The light beam is incident on the second surface 12 and reflected by the two surfaces $12_1$ and $12_2$ as light beams travelling along respective optical paths. The reflected light beams are internally reflected by the third surface 13 to exit the decentered prism 10 while being refracted through the fourth surface 14. The two light beams are reflected by the concave mirror 21 and enter the exit pupils $1_1$ and $1_2$ separate from each other to form a real image on the concave mirror 21 at a distance of 400 millimeters from the position of each exit pupil (i.e. an intermediate image of the image display device 3 is formed on the concave mirror 21 by the decentered prism 10).

In this example, the concave mirror 21 and the first to fourth surfaces 11 to 14 of the decentered prism 10 are all formed from free-form surfaces.

Numerical data in each example will be shown below. In the tables below, "FFS" denotes a free-form surface, and "RE" denotes a reflecting surface.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | FFS① (RE) | | (1) | | |
| 3 | FFS② | | (2) | 1.5254 | 56.2 |
| 4 | FFS③ (RE) | | (3) | 1.5254 | 56.2 |
| 5 | FFS④ (RE) | | (4) | 1.5254 | 56.2 |
| 6 | FFS⑤ | | (5) | | |
| Image plane | ∞ | | (6) | | |

FFS①

| $C_4$ | $-4.3277 \times 10^{-3}$ | $C_6$ | $-3.1324 \times 10^{-3}$ | $C_8$ | $6.5334 \times 10^{-6}$ |
| $C_{10}$ | $5.7777 \times 10^{-6}$ | | | | |

FFS②

| $C_4$ | $3.5167 \times 10^{-2}$ | $C_6$ | $-5.9257 \times 10^{-2}$ | $C_8$ | $-4.5764 \times 10^{-3}$ |
| $C_{10}$ | $-1.2743 \times 10^{-4}$ | | | | |

FFS③

| $C_4$ | $-1.8901 \times 10^{-3}$ | $C_5$ | $1.7416 \times 10^{-2}$ | $C_6$ | $-5.5547 \times 10^{-2}$ |
| $C_7$ | $3.1408 \times 10^{-4}$ | $C_8$ | $-2.7604 \times 10^{-3}$ | $C_9$ | $-2.6486 \times 10^{-3}$ |
| $C_{10}$ | $1.3332 \times 10^{-3}$ | | | | |

FFS④

| $C_4$ | $-1.9553 \times 10^{-2}$ | $C_6$ | $-3.0093 \times 10^{-2}$ | $C_8$ | $-2.4995 \times 10^{-4}$ |
| $C_{10}$ | $-2.7945 \times 10^{-4}$ | | | | |

FFS⑤

| $C_4$ | $3.3092 \times 10^{-2}$ | $C_6$ | $7.4345 \times 10^{-2}$ | $C_8$ | $-2.9928 \times 10^{-3}$ |
| $C_{10}$ | $3.0439 \times 10^{-3}$ | | | | |

Displacement and tilt (1)

| X | −10.00 | Y | 0.00 | Z | 400.00 |
| α | 22.50 | β | 0.00 | γ | 0.00 |

Displacement and tilt (2)

| X | −10.00 | Y | −49.60 | Z | 350.51 |
| α | 17.73 | β | 0.00 | γ | 0.00 |

Displacement and tilt (3)

| X | −12.95 | Y | −57.02 | Z | 340.15 |
| α | 71.77 | β | −0.51 | γ | 0.00 |

Displacement and tilt (4)

| X | −10.00 | Y | −46.93 | Z | 336.80 |
| α | 120.43 | β | 0.00 | γ | 0.00 |

Displacement and tilt (5)

| X | −10.00 | Y | −59.97 | Z | 349.10 |
| α | 131.34 | β | 0.00 | γ | 0.00 |

-continued

| Surface No. | Radius of curvature | Surface separation | Displacement and tilt | Refractive index | Abbe's No. |
|---|---|---|---|---|---|
| Displacement and tilt (6) | | | | | |
| X | −10.00 | Y | −61.43 | Z | 350.54 |
| α | 120.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Pupil) | | | | |
| 2 | FFS① (RE) | | (1) | | |
| 3 | FFS② | | (2) | 1.5254 | 56.2 |
| 4 | FFS③ (RE) | | (3) | 1.5254 | 56.2 |
| 5 | FFS④ (RE) | | (4) | 1.5254 | 56.2 |
| 6 | FFS⑤ | | (5) | | |
| Image plane | ∞ | | (6) | | |

FFS①

| $C_4$ | −4.2165 × 10$^{-3}$ | $C_6$ | −3.4107 × 10$^{-3}$ | $C_8$ | 3.6256 × 10$^{-6}$ |
| $C_{10}$ | 8.4820 × 10$^{-6}$ | | | | |

FFS②

| $C_4$ | 2.4678 × 10$^{-2}$ | $C_6$ | −1.7395 × 10$^{-2}$ | $C_8$ | −3.3803 × 10$^{-3}$ |
| $C_{10}$ | 3.9173 × 10$^{-4}$ | | | | |

FFS③

| $C_4$ | −1.6897 × 10$^{-2}$ | $C_5$ | 3.6295 × 10$^{-2}$ | $C_6$ | −1.4614 × 10$^{-2}$ |
| $C_7$ | 1.0517 × 10$^{-3}$ | $C_8$ | −1.7559 × 10$^{-3}$ | $C_9$ | 7.4725 × 10$^{-4}$ |
| $C_{10}$ | −1.2463 × 10$^{-3}$ | | | | |

FFS④

| $C_4$ | −1.9611 × 10$^{-2}$ | $C_5$ | 8.7409 × 10$^{-3}$ | $C_6$ | −1.8702 × 10$^{-2}$ |
| $C_7$ | 6.6299 × 10$^{-6}$ | $C_8$ | −6.4091 × 10$^{-4}$ | $C_9$ | 1.2067 × 10$^{-4}$ |
| $C_{10}$ | −3.7457 × 10$^{-4}$ | | | | |

FFS⑤

| $C_4$ | 1.2576 × 10$^{-2}$ | $C_6$ | 1.1918 × 10$^{-1}$ | $C_8$ | 9.6789 × 10$^{-3}$ |
| $C_{10}$ | −1.3262 × 10$^{-2}$ | | | | |

Displacement and tilt (1)

| X | −32.00 | Y | 0.00 | Z | 400.00 |
| α | 22.50 | β | 0.00 | γ | 0.00 |

Displacement and tilt (2)

| X | −32.00 | Y | −53.51 | Z | 348.36 |
| α | −2.95 | β | 0.00 | γ | 0.00 |

Displacement and tilt (3)

| X | −41.69 | Y | −58.85 | Z | 339.63 |
| α | 54.98 | β | −9.31 | γ | 0.00 |

Displacement and tilt (4)

| X | −43.06 | Y | −47.64 | Z | 341.97 |
| α | 94.78 | β | 17.84 | γ | 0.00 |

Displacement and tilt (5)

| X | −32.00 | Y | −65.22 | Z | 349.57 |
| α | 115.43 | β | 0.00 | γ | 0.00 |

Displacement and tilt (6)

| X | −32.00 | Y | −66.27 | Z | 350.00 |
| α | 120.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −400.00 | | | |
| 1 | ∞ (Pupil) | | | | |
| 2 | FFS① (RE) | | (1) | | |
| 3 | FFS② | | (2) | 1.5254 | 56.2 |
| 4 | FFS③ (RE) | | (3) | 1.5254 | 56.2 |
| 5 | FFS④ (RE) | | (4) | 1.5254 | 56.2 |
| 6 | FFS⑤ | | (5) | | |
| Image plane | ∞ | | (6) | | |

FFS①

| $C_4$ | −4.3080 × 10$^{-3}$ | $C_6$ | −3.7010 × 10$^{-3}$ | $C_8$ | 2.1404 × 10$^{-6}$ |
| $C_{10}$ | 7.2413 × 10$^{-6}$ | | | | |

FFS②

| $C_4$ | 5.3135 × 10$^{-2}$ | $C_6$ | −1.6126 × 10$^{-2}$ | $C_8$ | −3.0653 × 10$^{-3}$ |
| $C_{10}$ | 8.6478 × 10$^{-5}$ | | | | |

FFS③

| $C_4$ | 7.0826 × 10$^{-3}$ | $C_5$ | 1.1045 × 10$^{-2}$ | $C_6$ | −2.2447 × 10$^{-2}$ |
| $C_7$ | 5.1051 × 10$^{-4}$ | $C_8$ | −1.6915 × 10$^{-3}$ | $C_9$ | 3.7474 × 10$^{-4}$ |
| $C_{10}$ | −2.0931 × 10$^{-3}$ | | | | |

FFS④

| $C_4$ | −1.3720 × 10$^{-2}$ | $C_6$ | −2.2475 × 10$^{-2}$ | $C_8$ | −5.5374 × 10$^{-4}$ |
| $C_{10}$ | −6.7059 × 10$^{-4}$ | | | | |

FFS⑤

| $C_4$ | 4.2957 × 10$^{-2}$ | $C_6$ | 6.4974 × 10$^{-2}$ | $C_8$ | 6.1642 × 10$^{-3}$ |
| $C_{10}$ | 5.8767 × 10$^{-3}$ | | | | |

Displacement and tilt (1)

| X | −10.00 | Y | 0.00 | Z | 400.00 |
| α | 22.50 | β | 0.00 | γ | 0.00 |

Displacement and tilt (2)

| X | −10.00 | Y | −49.82 | Z | 350.02 |
| α | 0.32 | β | 0.00 | γ | 0.00 |

Displacement and tilt (3)

| X | −13.11 | Y | −56.56 | Z | 337.58 |
| α | 56.77 | β | −3.16 | γ | 0.00 |

Displacement and tilt (4)

| X | −10.00 | Y | −47.07 | Z | 338.31 |
| α | 108.56 | β | 0.00 | γ | 0.00 |

Displacement and tilt (5)

| X | −10.00 | Y | −58.19 | Z | 348.53 |
| α | 143.77 | β | 0.00 | γ | 0.00 |

Displacement and tilt (6)

| X | −10.00 | Y | −60.19 | Z | 350.00 |
| α | 120.00 | β | 0.00 | γ | 0.00 |

It should be noted that the decentered prism 10 for use in the optical path splitting element according to the present invention is not necessarily limited to the type of prism used in the foregoing Examples 1 to 3, in which there are two internal reflections. It is possible to use an optical system comprising a decentered prism of other type in which there is at least one internal reflection. It is also possible to use an optical system comprising a combination of such decentered prisms.

As will be clear from the foregoing description, the present invention provides a compact optical path splitting element having a reduced number of components and also provides an image display apparatus using the optical path splitting element. That is, the present invention provides an optical path splitting element having at least two split axial principal rays each extending from the center of an object to the center of an image. The optical path splitting element uses a three-dimensional optical system in which bent segments forming each of the axial principal rays lie in at least two planes, thereby making the optical path splitting element compact in size. At the same time, a power is given to the optical path splitting element to reduce the number of components thereof.

What we claim is:

1. An optical path splitting element for splitting a light beam from a single object into at least two optical paths, said optical path splitting element comprising a prism member formed from a medium having a refractive index (n) larger than 1 (n>1), said prism member having:

an entrance surface through which the light beam from said object enters said prism member;

at least one reflecting surface reflecting the light beam within said prism member; and an exit surface through which the light beam exits said prism member;

said prism member having at least one rotationally asymmetric surface;

wherein at least one optical functional surface of said prism member is a discontinuous surface formed from at least two surfaces adjacent to each other, and other optical functional surfaces of said prism member are common to said at least two optical paths.

2. An image display apparatus comprising:

an optical path splitting element for splitting a light beam from a single object into at least two optical paths;

an image display device disposed at a position of said object; and an ocular optical system having at least a positive power to project the at least two optical paths split by said optical path splitting element near an eyeball of an observer;

wherein said optical path splitting element has a prism member formed from a medium having a refractive index (n) larger than 1 (n>1), said prism member having:

an entrance surface through which the light beam from said object enters said prism member;

at least one reflecting surface reflecting the light beam within said prism member; and an exit surface through which the light beam exits said prism member;

said prism member having at least one rotationally asymmetric surface;

wherein at least one optical functional surface of said prism member is a discontinuous surface formed from at least two surfaces adjacent to each other, and other optical functional surfaces of said prism member are common to said at least two optical paths.

3. An image display apparatus according to claim 2, wherein said ocular optical system has at least one rotationally asymmetric surface.

4. An image display apparatus according to claim 2, wherein said ocular optical system is a reflecting optical system.

5. An image display apparatus according to claim 2, wherein said ocular optical system is a refracting optical system.

6. An image display apparatus according to claim 2, wherein said ocular optical system is a diffractive optical system.

7. An image display apparatus according to claim 2, wherein said ocular optical system has directional diffusion properties.

8. An image display apparatus according to claim 2, wherein a virtual image of each optical path is formed near a point of intersection between optical axes of said at least two optical paths after exiting said ocular optical system.

9. An image display apparatus according to claim 2, wherein exit pupils formed in said at least two optical paths exiting said ocular optical system are disposed apart from each other by a distance corresponding to an interpupillary distance of the observer.

10. An image display apparatus according to claim 2, wherein the at least two optical paths split by said optical path splitting element intersect each other near said ocular optical system, and a virtual image of each optical path is formed near said ocular optical system.

11. An image display apparatus according to claim 2, wherein said discontinuous surface of said optical path splitting element that is formed from at least two surfaces is a surface near a pupil position within said optical path splitting element.

12. An image display apparatus according to claim 2, wherein said ocular optical system is retractable from the optical paths so that said image display apparatus is usable as a projector.

13. An image display apparatus according to claim 2, wherein a position of said image display device is adjustable relative to said optical path splitting element.

14. An image display apparatus according to claim 2, further comprising:

a light source for illuminating said image display device; and an external light source unit removably attached to a body of said image display apparatus.

* * * * *